(12) United States Patent
Ikeda et al.

(10) Patent No.: US 7,033,074 B2
(45) Date of Patent: Apr. 25, 2006

(54) TEMPERATURE-SENSOR FIXING HOLDER

(75) Inventors: Tomohiro Ikeda, Shizuoka-ken (JP); Yoshiaki Ichikawa, Shizuoka-ken (JP)

(73) Assignee: YAZAKI Corporation, Tokyo (JP)

( * ) Notice: Subject to any disclaimer, the term of this patent is extended or adjusted under 35 U.S.C. 154(b) by 0 days.

(21) Appl. No.: 10/785,079

(22) Filed: Feb. 25, 2004

(65) Prior Publication Data

US 2004/0165648 A1   Aug. 26, 2004

(30) Foreign Application Priority Data

Feb. 26, 2003  (JP) .......................... P2003-049021

(51) Int. Cl.
*G01K 1/00* (2006.01)
(52) U.S. Cl. ..................................... 374/208
(58) Field of Classification Search ............... 374/208, 374/147, 194, 153, 150
See application file for complete search history.

(56) References Cited

U.S. PATENT DOCUMENTS

| | | | | | |
|---|---|---|---|---|---|
| 1,942,506 | A | * | 1/1934 | Bolton | 374/194 |
| 1,947,175 | A | * | 2/1934 | Schneider | 374/194 |
| 2,021,283 | A | * | 11/1935 | Bolton | 374/194 |
| 2,636,240 | A | * | 4/1953 | Pokorny | 374/194 |
| 2,906,124 | A | * | 9/1959 | Chaney | 374/194 |
| 3,983,753 | A | * | 10/1976 | Greenleaf et al. | 374/208 |
| 4,435,095 | A | * | 3/1984 | Jones et al. | 374/194 |
| 5,000,581 | A | * | 3/1991 | Yata et al. | 374/150 |
| 5,454,641 | A | * | 10/1995 | Parker et al. | 374/147 |
| 5,829,880 | A | * | 11/1998 | Diedrich | 374/208 |
| 6,334,707 | B1 | * | 1/2002 | Ku | 374/208 |
| 6,550,962 | B1 | * | 4/2003 | Yang et al. | 374/147 |
| 6,792,848 | B1 | * | 9/2004 | Janky | 374/150 |

FOREIGN PATENT DOCUMENTS

JP   2001-289454   10/2001

\* cited by examiner

*Primary Examiner*—Diego Gutierrez
*Assistant Examiner*—Mirellys Jagan
(74) *Attorney, Agent, or Firm*—Finnegan, Henderson, Farabow, Garrett & Dunner, L.L.P.

(57) ABSTRACT

A temperature-sensor fixing holder detachably fixes a temperature sensor to a secondary battery. The fixing holder includes a connecting body made of a rubber and a couple of link bodies. The fixing body is substantial U-shaped in a cross section by connecting the sides of first end portions of the link bodies integrally to both ends of the connecting body respectively. A link opening is formed in the first end portion of each link body, and a notched portion is formed in a second end portion of each link body. The temperature sensor is fixed to the secondary battery according to the following process. After the connecting body is curved to surround the temperature sensor, a couple of hook portions of the temperature sensor are inserted into the link openings respectively. At the same time, lead wires of the temperature sensor are held between the connecting body and the temperature sensor. After central portions of the link bodies are bent toward the secondary battery under that condition, the notched portions are inserted into recesses formed on top ends of protrusions of the secondary battery respectively.

12 Claims, 6 Drawing Sheets

TEMPERATURE-SENSOR FIXING HOLDER

CROSS REFERENCE TO RELATED APPLICATION

This application claims benefit of priority under 35 U.S.C. § 119 to Japanese Patent Application No. 2003-49021, filed on Feb. 26, 2003, the entire contents of which are incorporated by reference herein.

BACKGROUND OF THE INVENTION

1. Field of the Invention

The present invention relates to a fixing holder for a temperature sensor, which may detect a temperature of a battery, etc.

2. Description of the Related Art

A conventional temperature-sensor fixing holder is disclosed in Japanese Patent Provisional Publication 2001-289454. As shown in FIG. 1, a temperature sensor 1 measures a temperature of heated water running through a rubber tube 2.

A temperature-sensor fixing holder, as shown in FIG. 2, comprises a clamp band 3 and a stop aid 4. A tubular pedestal 2a protrudes from the side surface of the tube 2. A receiving-hole portion 2b is formed at the center of the tubular pedestal 2a. In order to measure a temperature of heated water running through the tube 2 via the bottom surface of the receiving-hole portion 2b, a temperature-sensitive portion 1a disposed at the distal end of the temperature sensor 1 is inserted into the receiving-hole portion 2b. Under that condition, the temperature sensor 1 is prevented from coming out of the tubular pedestal 2a by clamping the side surface of the tubular pedestal 2a using the clamp band 3.

Further, a folded portion 4a of the stop aid 4 is hooked over a knob 3a of the clamp band 3, and curved portions 4b, 4b of the stop aid 4 are elastically linked to one end of a protective tube 1b of the temperature sensor 1. According to the above construction, the temperature sensor 1 is prevented from coming out of the tubular pedestal 2a by external force F1 acting along the axial direction of the temperature sensor.

The conventional temperature-sensor fixing holder, however, requires a plurality of independent components (the clamp band 3 and the stop aid 4) in order to prevent the temperature sensor 1 from coming out of the tubular pedestal 2a. Therefore, complication of fixing operations and increase in production cost are brought.

Additionally, lead wires 1c is directly exposed out of the other end of the protective tube 1b of the temperature sensor 1 in the exterior of the temperature sensor 1. Therefore, the lead wires 1c are liable to be cut off from the other end of the protective tube 1b by external force F1 acting along the axial direction of the lead wires 1c, and the lead wires 1c are also liable to be broken at the other end of the protective tube 1b by external force F2 acting along the radial direction of the lead wires 1c.

SUMMARY OF THE INVENTION

The present invention aims to provide a temperature-sensor fixing holder to realize simplification of fixing operations and reduction in production cost. The present invention also aims to provide a temperature-sensor fixing holder in which exposed electrical wires can be prevented from being broken from the temperature sensor by external force.

In order to achieve the above object, the present invention provides a temperature-sensor fixing holder for detachably fixing the temperature sensor to a fixed body comprising a resilient holder body, a first link portion formed into the holder body to be engaged with an engagement portion of the temperature sensor, and a second link portion formed into the holder body to be engaged with an engagement portion of the fixed body, wherein the holder body resiliently deforms when the first link portion is engaged with the engagement portion of the temperature sensor and the second link portion is also engaged with the engagement portion of the fixed body.

According to the present invention, when a fixing holder is mounted on a temperature sensor, a first link portion of a holder body is easily and securely engaged with an engagement portion of the temperature sensor by deforming the holder body resiliently. Under that condition, a second link portion of the holder body is easily and securely engaged with an engagement portion of a secondary battery. Consequently, the temperature-sensor fixing holder realizes simplification of fixing operations and reduction in production cost.

DESCRIPTION OF THE PREFFERED EMBODIMENT

Figure 1:
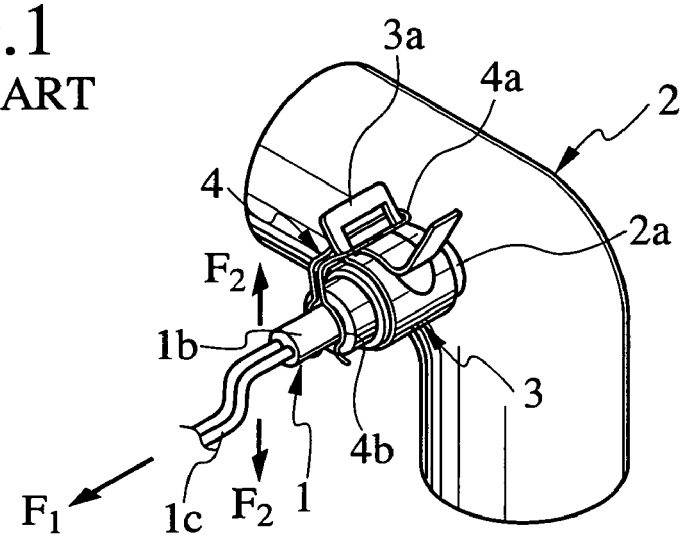
FIG. 1 is a perspective view of a conventional temperature-sensor fixing holder.
Figure 2:
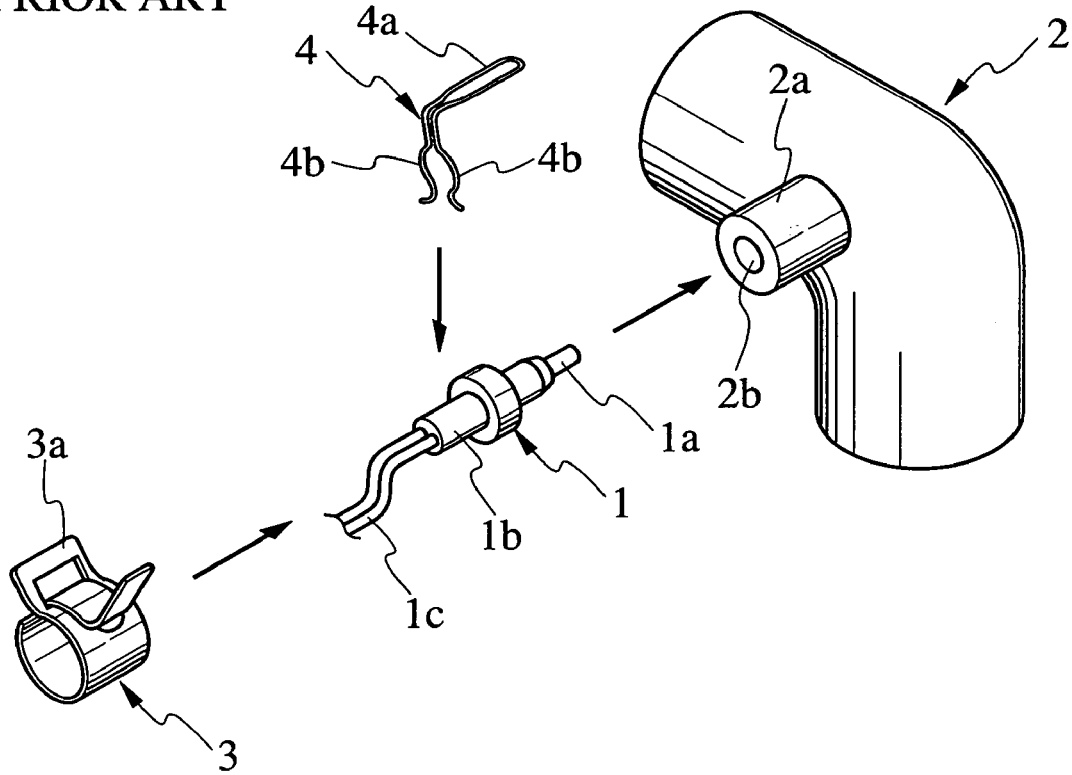
FIG. 2 is an exploded perspective view of the conventional fixing holder.
Figure 3:
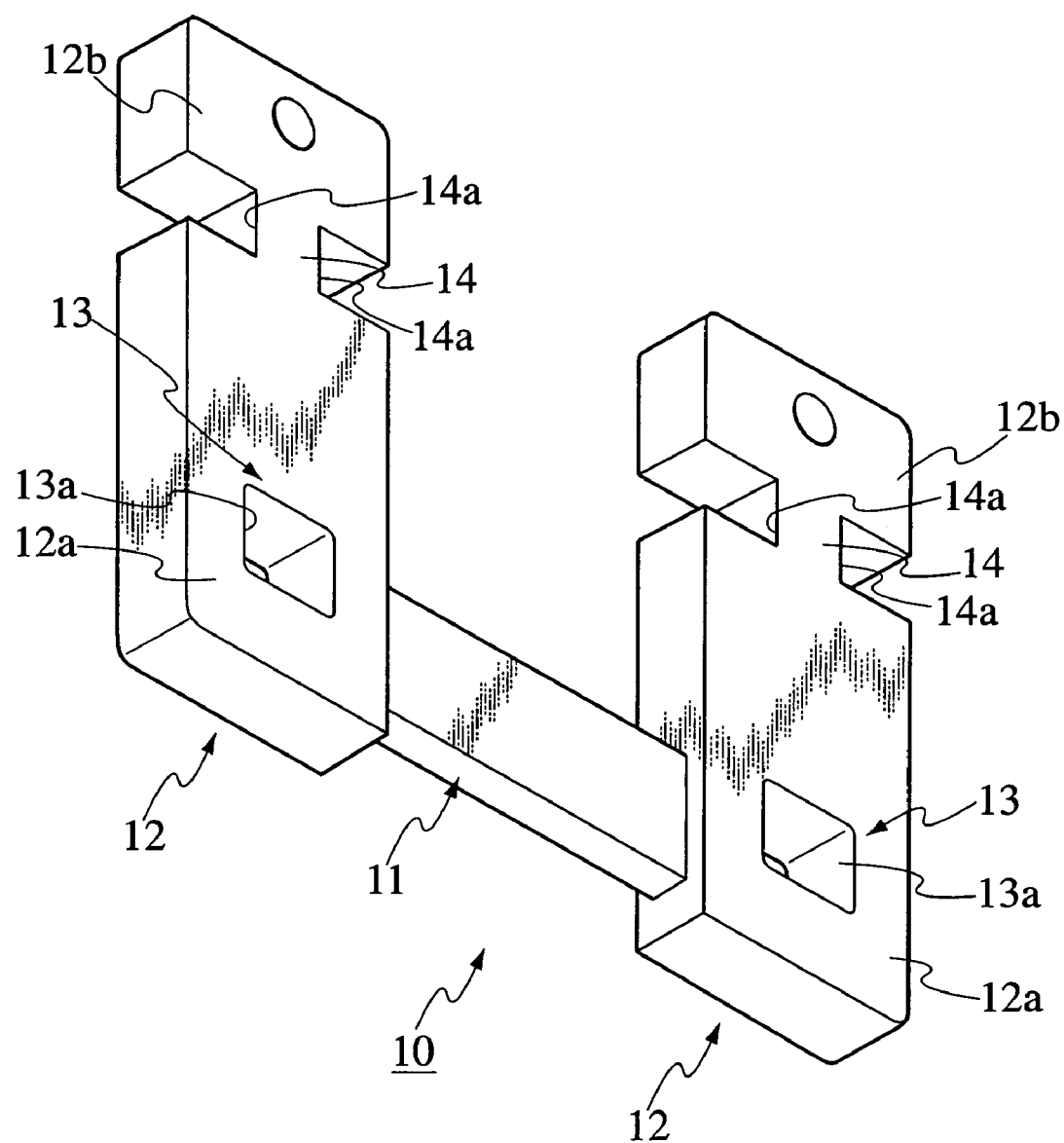
FIG. 3 is a perspective view of a temperature-sensor fixing holder pertaining to an embodiment of the present invention.

Referring to FIGS. 3 to 7, an embodiment of the present invention will be described. A fixing holder 10 detachably fixes a temperature sensor 20 to a secondary battery 30. As shown in FIG. 3, the fixing holder 10 comprises a connecting body 11 and link bodies 12, 12 (holder bodies). The connecting body 11 and the link bodies 12, 12 are the members made of a rubber in the shape of a band. The holder body 10 is substantially U-shaped in a cross section and formed by integrally connecting the side surfaces of end portions 12a, 12a of the link bodies 12, 12 to both edge surfaces of the connecting body 11. A thickness of the connecting body 11 is thinner than those of the link bodies 12, 12.

The link bodies 12, 12 have perforated link portions (first link portions) 13, 13 at the end portions 12a, 12a thereof. Rectangular link openings 13a, 13a are formed in the center area of the perforated link portions 13, 13. In the fixing holder 10, there is a straight line relationship among the link openings 13a, 13a and the connecting body 11. The link bodies 12, 12 have notched portions (second link portions) 14, 14 at the end portions 12b, 12b thereof. Rectangular link grooves 14a, 14a are formed on both sides of each notched portion 14.

Figure 4:
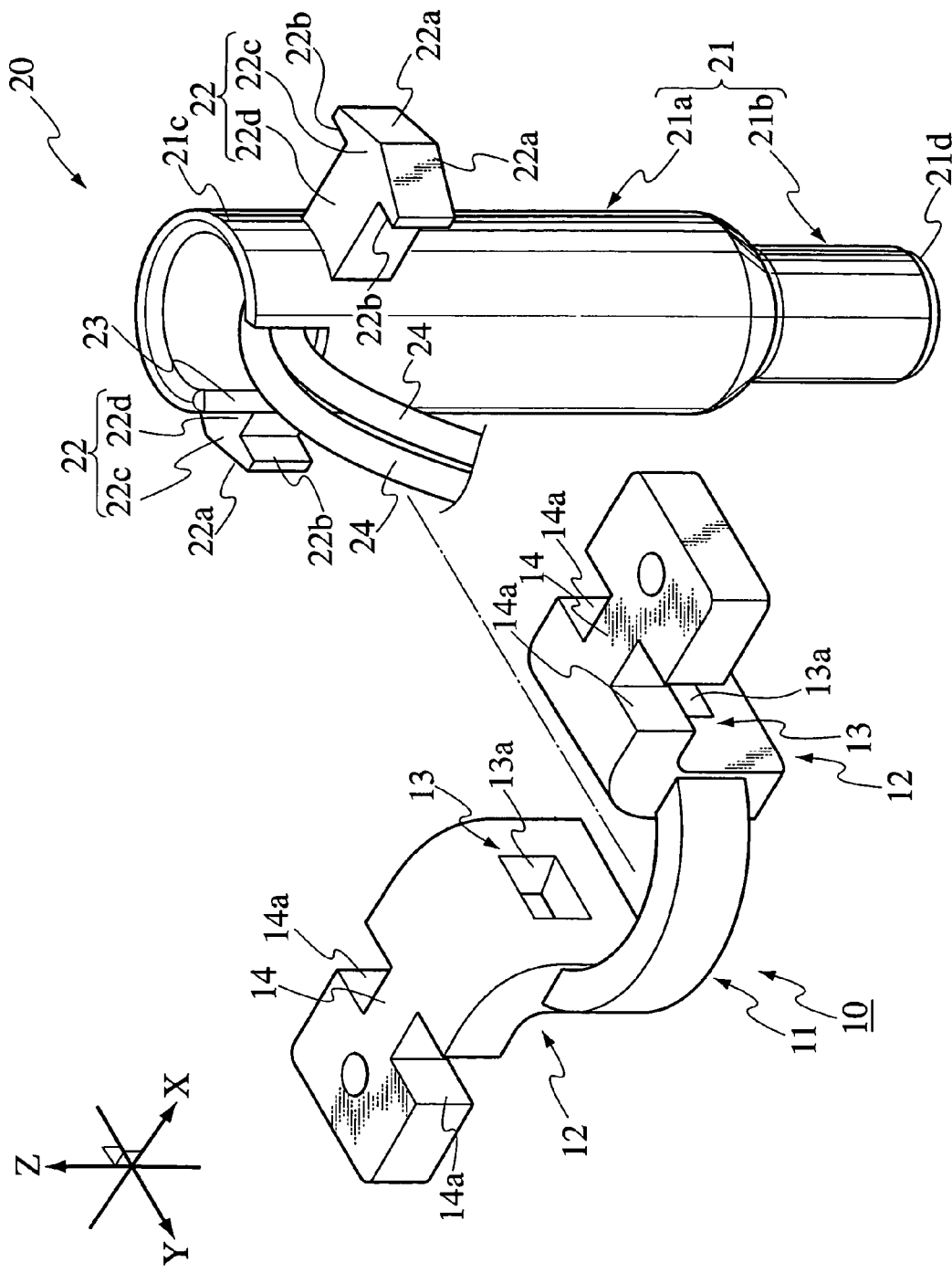
FIG. 4 is a perspective view showing the state where the fixing holder pertaining to the embodiment of the present invention is deformed to be curved for being fixed onto a temperature sensor.

As shown in FIG. 4, a temperature sensor 20 comprises a sensor body 21, hook portions (engagement portions) 22, 22, a cut portion 23 and a thermostat (not shown). Additionally, in FIGS. 4 to 7, set are an X-axis in the extending direction of the hook portions 22, 22 protruding from the sides of the temperature sensor 20, a Y-axis in the opening direction of the cut portion 23 formed on one side of the temperature sensor 20 and a Z-axis in the axial direction of the temperature sensor 20. Moreover, the X-axis, Y-axis and Z-axis are perpendicular to one another.

The sensor body 21 has a main body 21a and a temperature-sensitive portion 21b. The main body 21a and the temperature-sensitive portion 21b are formed in the shape of a cylinder. A diameter of the main body 21a is larger than that of the temperature-sensitive portion 21b. Further, the diameter of the main body 21a is shorter than that of a longer side of the connecting body 11. The temperature-sensitive portion 21b is integrally connected to the end (on the −Z side) of the main body 21a so as to align the axis of the temperature-sensitive portion 21b with that of the main body 21a. According to the above construction, the sensor body 21 results in the shape of a cylinder with a difference in diameter.

One hook portion 22 is opposed to the other hook portion 22. Each of the hook portions 22, 22 is integrally connected to the side of an end portion 21c of the main body 21a. The hook portions 22, 22 includes top portions 22c, 22c and base portions 22d, 22d. The hook portions 22, 22 are substantially T-shaped in the cross section in the X-Y plane. Structure of each hook portion 22 will be described in the following. Front surfaces 22a, 22a of the top portion 22c approach rear surfaces 22b, 22b as moving away from the central portion of the top portions 22c in the front surfaces 22a, 22a. A length of the top portion 22c, 22c in the longitudinal direction (the direction along the Y-axis) is slightly larger than that of longer sides (sides along the Y-axis) of the link opening 13a, 13a of the fixing holder 10. A length in the width direction (the direction along the Y-axis) of the base portions 22d, 22d is equal to that of longer sides (sides along the Y-axis) of the link openings 13a, 13a of the fixing holder 10. A thickness of the base portions 22d, 22d is equal to that of shorter sides (sides along the Z-axis) of the link openings 13a, 13a of the fixing holder 10. A length of the base portions 22d, 22d in the longitudinal direction (the direction along the X-axis) is equal to a depth of the link openings 13a, 13a (a thickness of the link bodies 12, 12) of the fixing holder 10.

The cut portion 23 is formed in one side of the end portion 21c of the main body 21a in order to expose a couple of lead wires (electrical wires) 24, 24 to be connected to the thermostat, etc. toward the exterior of the temperature sensor 20. The thermostat is contained within the sensor body 21 in order to measure a temperature of a surface 30a of the secondary battery 30.

Figure 6:
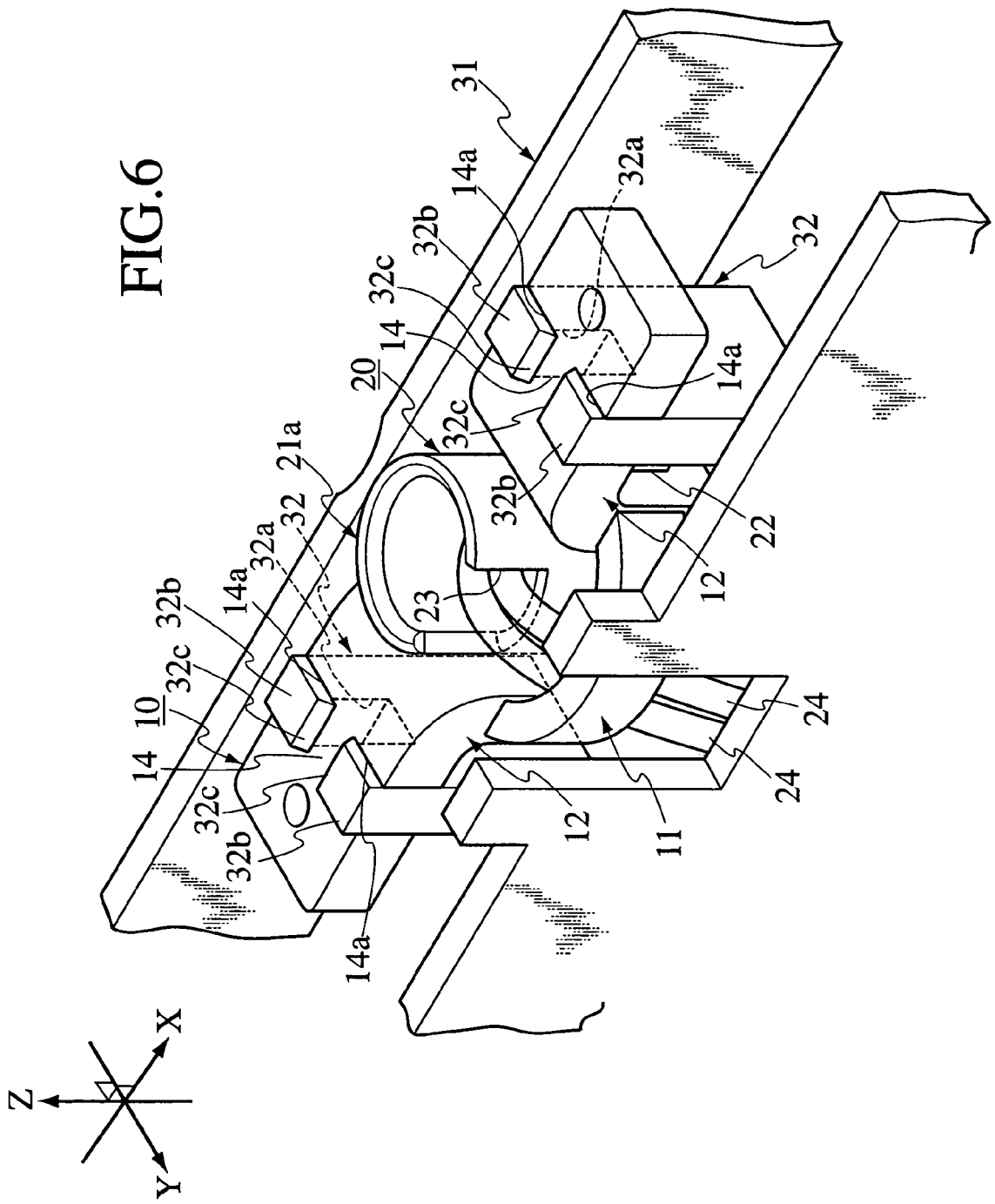
FIG. 6 is a partly perspective view showing the state where the temperature sensor is fixed onto a secondary battery using the fixing holder pertaining to the embodiment of the present invention.
Figure 7:
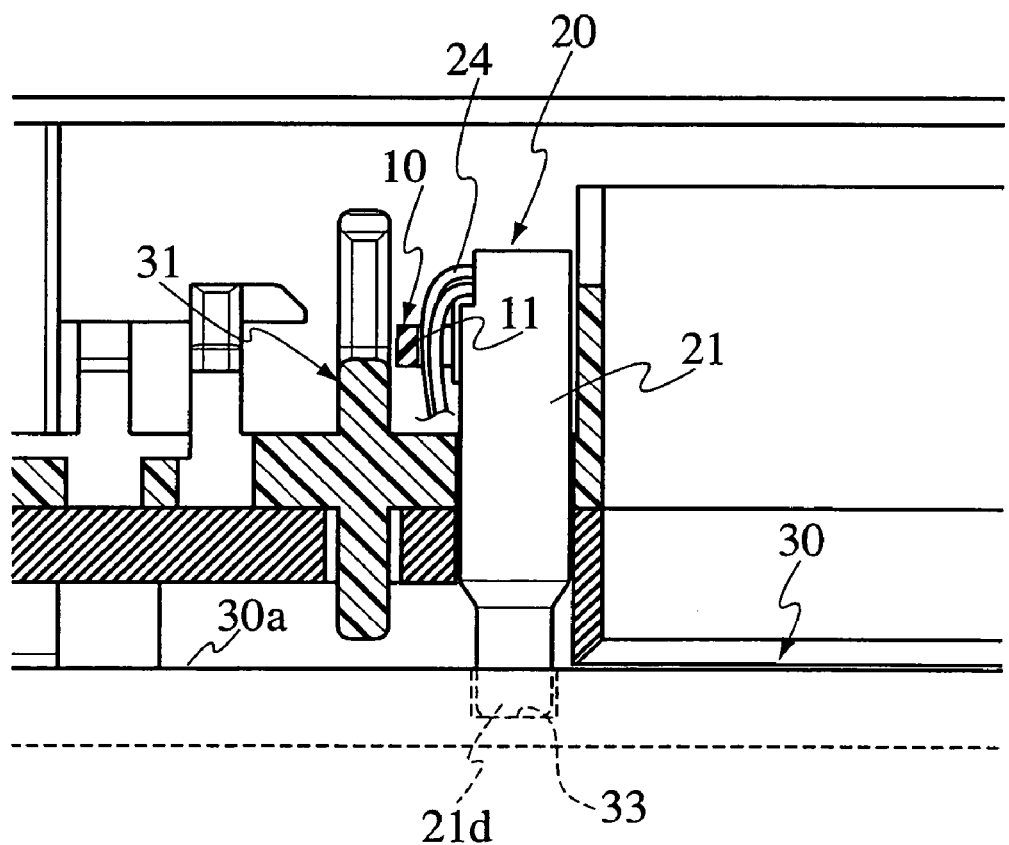
FIG. 7 is a cross-sectional view showing the state where the temperature sensor is fixed onto a secondary battery using the fixing holder pertaining to the embodiment of the present invention.

As shown in FIGS. 6 and 7, the secondary battery 30 has a support plate (a fixed body) 31 and protrusions 32, 32 provided above the surface 30a, and a hole 33 formed in the surface 30a. The support plate 31 is made of a synthesized resin and disposed above (in the +Z direction) the surface 30a of the secondary battery 30 in order to hold the temperature sensor 20.

The protrusions 32, 32 standing upward from the surface 30a of the secondary battery 30 are disposed integrally on the support plate 31 along the X-axis such that one protrusion 32 is opposed to the other protrusion 32 at regular intervals. A length of the protrusions 32, 32 in the longitudinal direction (the direction along the Y-axis) is equal to that in the width direction (the direction along the Y-axis) of the link bodies 12, 12 of the fixing holder 10. A length of the protrusions 32, 32 in the width direction (the direction along the X-axis) is equal to that in the longitudinal direction (the direction along the X-axis) of the notched portions 14, 14 of the fixing holder 10. Recesses 32a, 32a (engagement portions) are formed in the central portions of the top ends of the protrusions 32, 32. A length of the recesses 32a, 32a in the width direction (the direction along the Y-axis) is equal to that in the width direction (the direction along the Y-axis) of the notched portions 14, 14 of the fixing holder 10. A depth of the recesses 32a, 32a is equal to the thickness of the link bodies 12, 12 of the fixing holder 10. Further, engagement claws 32b, 32b are disposed to be opposed to each other on the top end of each protrusion 32. The engagement claws 32b, 32b slightly overhang from both ends of the protrusion 32 over the valley portion of the recess 32a. End surfaces 32c, 32c of the engagement claws 32b, 32b approach to each other as moving downward (in the −Z direction) on the end surfaces 32c, 32c.

The hole 33 is formed between the protrusions 32, 32 in the surface 30a. A diameter of the hole 33 is equal to that of the temperature-sensitive portion 21b of the temperature sensor 20.

Next, a method of engaging the fixing holder 10 with the temperature sensor 20 will be described.

Figure 5:
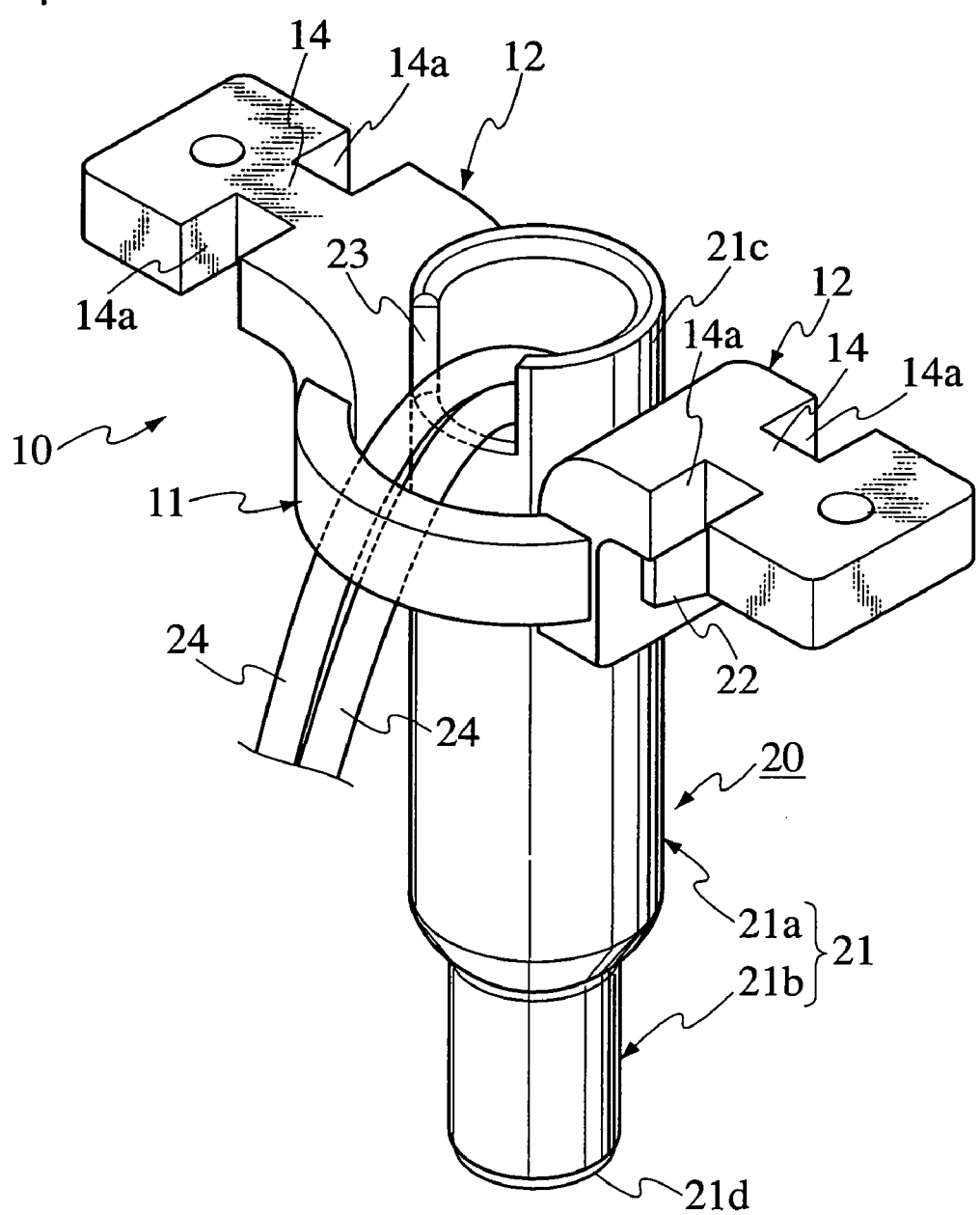
FIG. 5 is a perspective view showing the state where the fixing holder pertaining to the embodiment of the present invention is mounted on the temperature sensor.

As shown in FIGS. 4 and 5, after the connecting body 11 of the fixing holder 10 is curved to surround the sensor body 21 of the temperature sensor 20, the hook portions 22, 22 are inserted into the link openings 13a, 13a of the fixing holder 10, respectively. Thereby, the base portions 22d, 22d of the hook portions 22, 22 are received into the link openings 13a, 13a respectively.

Since the top portions 22c, 22c of the hook portions 22, 22 are longer than the link openings 13a, 13a in the direction along the Y-axis, the temperature sensor 20 is hard to come out of the fixing holder 10.

At the same time, the lead wires 24, 24 exposed out of the cut portion 23 toward the exterior of the temperature sensor 20 are held between the connecting body 11 of the fixing holder 10 and the main body 21a of the temperature sensor 20.

Next, a method of engaging the fixing holder 10, which has been engaged with the temperature sensor 20, with the secondary battery 30 will be described.

After abutting an end portion 21d of the temperature sensitive portion 21b of the temperature sensor 20 on the bottom surface of the hole 33 of the secondary battery 30, the central portions of the link bodies 12, 12 of the fixing holder 10 are bent toward the secondary battery 30 side. Then, as shown in FIG. 6, the notched portions 14, 14 of the fixing holder 10 are respectively inserted into the recesses 32a, 32a of the protrusions 32, 32 of the secondary battery 30. Thereby, the notched portions 14, 14 are received into the recesses 32a, 32a.

Since the engagement claws 32b, 32b of each protrusion 32 slightly overhang over the valley portion of the recess 32a in the direction along the Y-axis, the fixing holder 10 is hard to come out of the secondary battery 30.

The temperature-sensor fixing holder according to the present embodiment is characterized by the following.

After the connecting body 11 of the fixing holder 10 is curved to surround the sensor body 21, the temperature sensor 20 is engaged with the fixing holder 10 by inserting the hook portions 22, 22 of the temperature sensor 20 into the link openings 13a, 13a of the fixing holder 10. Moreover, the top portions 22c, 22c of the hook portions 22, 22 are longer than the link openings 13a, 13a. Consequently, the temperature sensor 20 is easily fixed to the fixing holder 10 and the temperature sensor 20 is also hard to come out of the fixing holder 10.

When the fixing holder 10 is fixed to the temperature sensor 20, the lead wires 24, 24 are held between the connecting body 11 of the fixing holder 10 and the sensor body 21 of the temperature sensor 20. Therefore, the lead wires 24, 24 are hard to be broken from the temperature sensor 20 by external force.

After the central portions of the link bodies 12, 12 of the fixing holder 10 are bent toward the secondary battery 30 side, the fixing holder 10 is engaged with the secondary battery 30 by inserting the notched portions 14, 14 of the fixing holder 10 into the recesses 32a, 32a of the protrusions 32, 32 of the secondary battery 30. Moreover, the engagement claws 32b, 32b of each protrusion 32 slightly overhang over the valley portion of the recess 32a. Consequently, the fixing holder 10 is easily fixed to the secondary battery 30 and the fixing holder 10 is also hard to come out of the secondary battery 30.

Since the fixing holder 10 is engaged with the secondary battery 30 in a state where the central portions of the link bodies 12, 12 of the fixing holder 10 are bent toward the secondary battery 30 side, restoring force occurring at the central portions of the link bodies 12, 12 work toward the end portion 21c of the temperature sensor 20. Therefore, the temperature sensor 20 is easily and accurately positioned without shaking at the location, to which the sensor should be fixed, provided on the support plate 31 of the secondary battery 30 by the restoring forces of the fixing holder 10. As a result, the end portion 21d of the temperature sensitive portion 21b of the temperature sensor 20 can be securely abutted on the bottom surface of the hole 33 formed on the surface 30a of the secondary battery 30 and a temperature of the surface 30a of the secondary battery 30 can be measured in a stable state.

The fixing holder 10 detachably fixes the temperature sensor 20 to the secondary battery 30 and also protects the lead wires 24, 24 of the temperature sensor 20. Therefore, the fixing holder 10 realizes simplification of fixing operations and reduction in production cost.

Since both the link bodies 12, 12 of the fixing holder 10 have the same shape, the fixing holder 10 realizes reduction in production cost.

Additionally, in the present embodiment, the link openings 13a, 13a are formed in the fixing holder 10 and the hook portions 22, 22 are also formed in the temperature sensor 20 in order to fix the fixing holder 10 to the temperature sensor 20. However, without being limited by the construction, it can be adopted that hook portions may be formed in the fixing body 10 and link openings may also be formed in the temperature sensor 20.

Further, in the present embodiment, the notched portions 14, 14 are formed in the fixing holder 10 and the recesses 32a, 32a are also formed in the temperature sensor 20 in order to fix the fixing holder 10 to the secondary battery 30. However, without being limited by the construction, it can be adopted that recesses may be formed in the fixing holder 10 and projections may be formed in the protrusions 32, 32.

What is claimed is:

1. A temperature-sensor fixing holder for detachably fixing a temperature sensor to a fixed body comprising:
    a resilient holder body;
    first link portions formed into the holder body to be engaged with engagement portions of the temperature sensor; and
    second link portions formed into the holder body to be engaged with engagement portions of the fixed body,
    wherein the holder body resiliently deforms about a first axis when the first link portions are engaged with the engagement portions of the temperature sensor and deforms about a second axis substantially orthogonal to the first axis when the second link portions are also engaged with the engagement portions of the fixed body.

2. The temperature-sensor fixing holder according to claim 1, wherein the holder body comprises:
    a connecting body formed in the shape of a band; and
    a plurality of link bodies formed in the shape of a band and connected integrally to both ends of the connecting body,
    wherein each of the link bodies has a first link portion and a second link portion.

3. The temperature-sensor fixing holder according to claim 2, wherein the holder body is substantially U-shaped in a cross section.

4. The temperature-sensor fixing holder according to claim 3, wherein a first link portion is disposed in a first end portion of each of the link bodies and a second link portion is disposed in a second end portion of each of the link bodies.

5. The temperature-sensor fixing holder according to claim 4, wherein there is a straight line relationship between the connecting body and the first link portions.

6. The temperature-sensor according to claim 5, wherein the connecting body curves to surround the temperature sensor when the first link portions are engaged with the engagement portions of the temperature sensor.

7. The temperature-sensor fixing holder according to claim 6, wherein lead wires of the temperature sensor are held between the connecting body and the temperature sensor.

8. The temperature-sensor fixing holder according to claim 6, wherein each of the first link portions is a perforated portion in the shape of a rectangle.

9. The temperature-sensor fixing holder according to claim 6, wherein each of the engagement portions of the temperature sensor comprises a plurality of hook portions, which are disposed on a side of the temperature sensor and protrude from the temperature sensor.

10. The temperature-sensor fixing holder according to claim 6, wherein a central potion of each of the link bodies is bent toward the fixed body when the second link portion is engaged with the engagement portion of the fixed body.

11. The temperature-sensor fixing holder according to claim 10, wherein each of the second link portions is a notched portion formed by removing partly both sides of the second end portion to form rectangle grooves.

12. The temperature-sensor fixing holder according to claim 10, wherein each of the engagement portions of the fixed body is a recess portion formed on the top end of a protrusion disposed on the fixed body and protruding from the fixed body.

* * * * *

UNITED STATES PATENT AND TRADEMARK OFFICE
CERTIFICATE OF CORRECTION

| | | |
|---|---|---|
| PATENT NO. | : 7,033,074 B2 | Page 1 of 1 |
| APPLICATION NO. | : 10/785079 | |
| DATED | : April 25, 2006 | |
| INVENTOR(S) | : Tomohiro Ikeda et al. | |

It is certified that error appears in the above-identified patent and that said Letters Patent is hereby corrected as shown below:

On the title page, item (57), Abstract line 4, "substantial" should read --substantially--.

Signed and Sealed this

Eighth Day of August, 2006

JON W. DUDAS
*Director of the United States Patent and Trademark Office*